Reissued Feb. 2, 1943

Re. 22,262

UNITED STATES PATENT OFFICE 22,262

TREATMENT OF CASEIN FIBERS

Theodoor Koch, Oosterbeek, and Henricus Anthonius van der Kroon, Arnhem, Netherlands, assignors to American Enka Corporation, Enka, N. C., a firm No Drawing. Original No. 2,169,955, dated August 15, 1939, Serial No. 203,700, April 22, 1938. Application for reissue May 9, 1940, Serial No. 334,294. In Germany May 11, 1937

9 Claims. (Cl. 18—54)

This invention relates to improvements in the treatment of casein fibers. It is known to manufacture threads from alkaline solutions of casein and to harden the threads thus formed in order to reduce their swelling property by treatment with aldehydes or with substances which give rise to aldehydes for example with formaldehyde or hexamethylenetetramine.

We have previously proposed to improve casein threads hardened as described above by neutralising any carboxyl groups remaining in the molecule by treatment for example with alkaline earths. In this way a product is obtained which possesses resistance to boiling water and which may thus be dyed in a hot neutral dye bath.

When, however, such casein fibers either alone or mixed with wool are to be treated in an acid medium or even in a dye bath containing chromic acid, the casein fibers are attacked and the material becomes slimy during the dyeing process and shrinks and sticks together during the subsequent drying operation.

We have now found that casein fibers may be rendered resistant even to hot acid dye baths by subjecting the fibers to treatment with nitrous acid in addition to treating them with aldehydes such as formaldehyde.

The present invention accordingly comprises a process for rendering casein fibers resistant to shrinkage or sticking in hot acid dye baths which consists in subjecting the fibers which have not previously been neutralised with alkaline reagents to treatment with nitrous acid and with an aldehyde or a substance giving rise to an aldehyde.

The treatment with nitrous acid may be varied in degree so that varying degrees of resistance to hot acid baths may be secured.

The source of nitrous acid may conveniently consist of an alkaline nitrite such as sodium nitrite and an acid, for example, glacial acetic acid. Alternatively the nitrous acid may be formed in situ by the reaction of acid groups in the casein with the added alkaline nitrite, e. g., sodium nitrite.

After the hardening treatment, any free carboxyl groups remaining in the casein molecule may if desired be neutralised as previously proposed.

It is desirable that the treatment of the fibers with nitrous acid should not be carried to excess since yellowing of the fiber then occurs. Any such yellowing produced may, however, be removed by treatment of the fibers with a reducing bleaching agent such, for example, as sodium hyposulphite ($Na_2S_2O_4$).

The nitrite treatment may conveniently be carried out by subjecting the casein fibers to a mixture of a solution of alkaline nitrite and a neutral dehydrating salt such as sodium sulphate or magnesium sulphate.

After treatment of the fibers with an aldehyde and with nitrous acid they may subsequently be treated with a softening agent such as glycerol, sulphonated oils, sulphonated fatty alcohols or other substances normally employed for that purpose.

Following is a description by way of example of several methods of carrying the invention into effect.

*Example I*

Casein fibers produced from an alkaline casein solution in known manner by means of an acid precipitating bath are thoroughly hardened with a 10% solution of formaldehyde. After washing and drying the fibers are treated at room temperature for two hours with a solution containing 8 grms. of sodium nitrite and 11 grms. of glacial acetic acid per 100 grms. of dried fiber. The fibers are then well washed and dried.

If fibrous material thus treated is dyed for an hour at 95° C. in a dye bath containing 4% of sulphuric acid with a bath ratio of 1 to 40 calculated on the weight of the fibrous material, practically no shrinkage or sticking together of the fibers occurs. In the absence of treatment with nitrous acid and under similar conditions of dyeing, a tender, brittle product which is stuck together is obtained.

*Example II*

Casein threads spun from a casein solution in the known manner are treated under tension with a solution containing 3% of nitrous acid and 8% of sodium sulphate. The excess of nitrous acid is removed by washing with water and the threads are then hardened with formaldehyde in the usual manner.

*Example III*

Casein fibers which have been treated in accordance with the process described in Example I or Example II are subjected to an after-treatment with a 3% solution of sodium hyposulphite at 60° C. The yellowing brought about during treatment with nitrous acid is thus completely removed. The fibrous material is then further treated with a saturated solution of lime in order to neutralise the residual carboxyl groups.

Finally it is well washed and dressed with a 0.2% solution of Brillantavirol.

The casein fibers treated as described above possess good resistance to hot acid wool-dyeing baths which may contain sulphuric acid but they are inferior to ordinary wool when they are subjected to an after-treatment and washing with weakly alkaline agents such as sodium carbonate solutions and the like. Under such treatment the casein fibers exhibit excessive swelling and slipperiness.

It has now further been found that in addition to producing a good resistance to hot acid wool-dyeing baths the above-mentioned swelling and slipperiness when employing alkaline after-treatment baths such as sodium carbonate may be avoided by applying to the casein fibers soluble nitrites without employing a special addition of acid. In such a case it would appear that the acid properties of the casein are just sufficient to liberate gently and gradually the necessary quantity of nitrous acid from the nitrites and to cause it to act on the fibers in the characteristic manner above described. This gentle and slow action appears to be of great importance in determining the behaviour of the treated casein fibers to alkaline washing baths, for example, solutions of sodium carbonate. It has been found that whereas casein still containing acid groups is capable of reacting with alkaline nitrites to give the advantageous results above referred to, casein neutralised beforehand with alkaline agents, such as alkaline earths, e. g., calcium hydroxide solution is not capable of so acting.

When the nitrite treatment is to be applied to highly swollen casein threads it is advantageous to add to the nitrite bath considerable quantities of dehydrating neutral salts such as sodium sulphate, magnesium sulphate and the like.

*Example IV*

Casein fibers spun in a manner known per se in an acid bath and pre-hardened with formaldehyde and dried are introduced into an after-treatment bath containing 7% of sodium nitrite and if desired 10% of sodium sulphate and are treated therein at room temperature for two hours at a bath ratio of 1 to 30. The material is then thoroughly hydro-extracted, washed and dried.

The nitrite solution may also be allowed to act on the casein fiber before the first drying and in such a case the formaldehyde treatment may be carried out before or after the nitrite treatment.

Having now set forth the invention as required by the patent statutes, what is claimed is:

1. In a process for rendering casein fibers resistant to shrinkage and sticking in hot acid dye baths wherein the fibers have been initially coagulated in an acid precipitating bath, the step which comprises subjecting the fibers to treatment with nitrous acid.

2. In a process for rendering casein fibers resistant to shrinkage and sticking in hot acid dye baths wherein the fibers have been initially coagulated in an acid precipitating bath, the steps which comprise hardening the fibers with an aldehyde solution and then subjecting the same to treatment with nitrous acid.

3. In a process for rendering casein fibers resistant to shrinkage and sticking in hot acid dye baths wherein the fibers have been initially coagulated in an acid precipitating bath, the steps which comprise subjecting the fibers to treatment with a solution of nitrous acid and sodium sulphate, washing the fibers to remove the excess nitrous acid and thereafter hardening the same with formaldehyde.

4. In a process for rendering casein fibers resistant to shrinkage and sticking in hot acid dye baths wherein the fibers have been initially coagulated in an acid precipitating bath, the steps which comprise hardening the fibers with a solution of formaldehyde, washing and drying the fibers, preparing a solution of sodium nitrite and acetic acid and treating the fibers with the same, and again washing and drying the fibers.

5. In a process for rendering casein fibers resistant to shrinkage and sticking in hot acid dye baths wherein the fibers have been initially coagulated in an acid precipitating bath, the step which comprises subjecting the fibers to treatment with nitrous acid by preparing a solution of an alkaline nitrite and impregnating the fibers therewith, and effecting liberation of nitrous acid by reacting said nitrite with the acid groups in the fibers.

6. In a process for rendering casein fibers resistant to shrinkage and sticking in hot acid dye baths wherein the fibers have been initially coagulated in an acid precipitating bath, the steps which comprise hardening the fibers with a formaldehyde solution and drying the same, treating the fibers in a bath containing sodium nitrite and a neutral dehydrating salt and again washing and drying the same.

7. In a process for rendering casein fibers resistant to shrinkage and sticking in hot acid dye baths wherein the fibers have been initially coagulated in an acid precipitating bath, the steps which comprise hardening the fibers with a solution of formaldehyde, washing and drying the same, treating the fibers with a solution of sodium nitrite and acetic acid, bleaching the thus treated fibers with a weak solution of sodium hyposulphite and finally neutralizing the residual carboxyl groups in the fibers with a saturated solution of lime, washing and dressing the same with a softening agent.

8. Hardened, coagulated, artificial filaments, threads, fibers and the like, formed from alkaline solutions of proteins, and characterized by water-repellent surfaces, by a soft handle, and by sufficiently high resistance to deterioration by hot dilute aqueous acid solutions to enable them to be dyed satisfactorily in acid wool dyeing baths.

9. An artificial filament of hardened coagulated casein characterized by water-repellent surfaces, by a soft handle, and by sufficiently high resistance to deterioration by hot dilute aqueous acid solutions to enable them to be dyed satisfactorily in acid wool dyeing baths.

THEODOOR KOCH.
HENRICUS ANTHONIUS VAN DER KROON.